Patented July 25, 1933

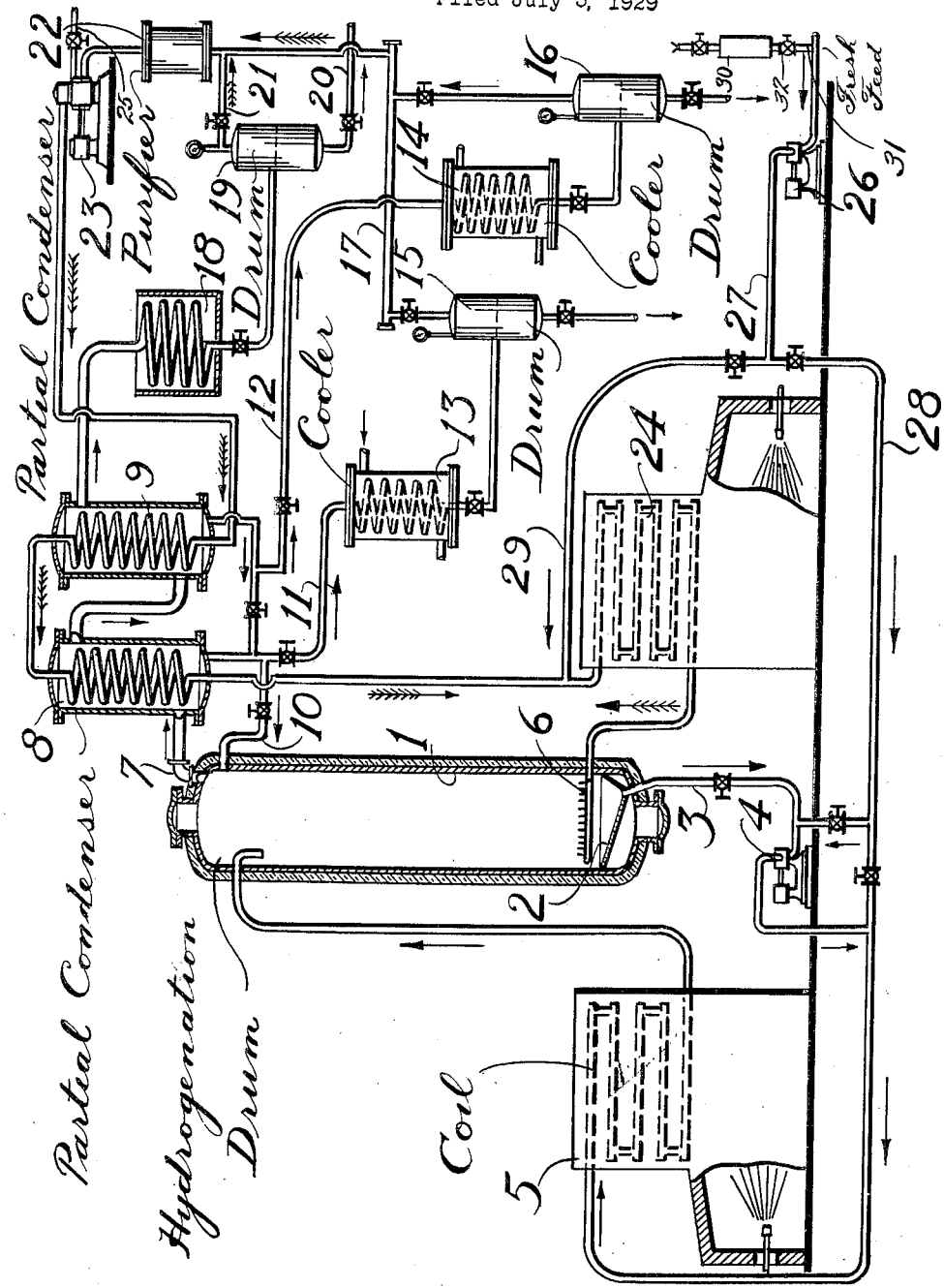

1,920,140

UNITED STATES PATENT OFFICE

HAROLD W. FISHER, OF BATON ROUGE, LOUISIANA, ASSIGNOR TO STANDARD-I. G. COMPANY

PROCESS FOR HYDROGENATION OF HYDROCARBON OILS

Application filed July 3, 1929. Serial No. 375,706.

The present invention relates to the art of obtaining valuable products from petroleum and its heavy fractions and more specifically comprises an improved method for carrying out the process of destructive hydrogenation of heavy oils. The method will be fully understood from the following description and the drawing.

The drawing is a semi-diagrammatic view in sectional elevation of an apparatus constructed according to the preferred method and shows the flow of material.

Referring to the drawing, reference character 1 denotes an elongated drum or chamber in which the hydrogenation takes place. The drum is vertically placed and is adapted to withstand the effects of high pressure hydrogen at an elevated temperature but may be of any preferred design. The drum may be heated in any suitable manner, for example, by internal electrical heaters (not shown), but it has been found to be most satisfactory to withdraw a part of the oily mass from the lower part 2 of the drum, which may be in a conical form, by means of a line 3. Pump 4 forces the oil through a heating coil 5 which discharges into the upper part of drum 1. Hydrogen or a gas rich in free hydrogen is forced into the lower part of the drum by a spray pipe 6 and if desired, a portion of the hydrogen may be passed through coil 5 with the oil.

Oil vapor and gas are taken off from the upper part of the drum by a vapor line 7 which communicates with suitable separation equipment, which may be of any preferred design, and comprises a series of condensers. Partial condensers 8 and 9 are shown through which the vapor flows in succession. Condensate from the condensers is collected and may be returned to drum 1 by reflux line 10 or separately by lines 11 and 12 to coolers 13 and 14, respectively, and thence to receiving drums 15 and 16. The condensate may be removed from these drums to storage (not shown) and gas is withdrawn to a manifold 17.

Gas and vapor uncondensed in condensers 8 and 9 are passed to a condenser 18 in which light oil is finally condensed and discharged into a separation drum 19. Distillate is removed by line 20 to storage (not shown) and gas is passed through line 21 to a purification system indicated at 22 which may comprise an oil scrubbing system for partial removal of hydrocarbon constituents and hydrogen sulphide, although other well known methods may be used. Gas from drums 15 and 16 is also preferably passed into the purifiers and the mixture is recompressed by booster pump 23. The gas is preheated by passage through condensers 9 and 10 or other means and is then heated by passage through a coil heater 24. The heated gas is then passed into drum 1 by line 6, as described above. Fresh or make-up hydrogen may be added by line 25.

Fresh feed oil to the system is forced in by pump 26 through line 27 and may be passed directly into recirculation line 3 by branch pipe 28, but it is preferable to pass a part of the feed by branch pipe 29 through coil 24 with the hydrogen.

In the operation of the process, the oil is held in drum 1 under hydrogen pressure in considerable excess of atmospheric, preferably at 20 to 200 atmospheres or higher, and at temperatures within the approximate range of 750 to 970° F. A catalytic material, which may be an oxide of chromium, molybdenum or a mixture of these oxides with each other or with other polyvalent metal oxides, is finely ground and suspended in the oil. The catalyst is pumped through the recirculation line, suspended in the oil. A supply of catalyst in suspension in oil is maintained in storage chamber 30, connected by pipe 31 to fresh feed line 27. When starting up the system or when it is necessary to inject more catalyst valve 32 in line 31 is opened and the suspension of catalyst in oil drawn in.

Catalytic materials used in this process are generally very dense substances which tend to settle from the oil rapidly, especially when heated to a high temperature, and it has been found that if the catalyst is permitted once to settle out in the drum, it is extremely difficult even with stirring means to disperse it properly. The present method largely prevents the rapid settling of the heavy catalyst by causing it to be carried to the top of the drum and to fall slowly to the bottom where it is collected and removed in a relatively thick slurry before it has begun to pack down and bond together with heavy decomposition products of the oil. By this means the apparatus can be kept in operation continuously for many days without excessive asphalt formation and without any tendency toward plugging of the drum and outlet line with coke and/or settled catalyst.

It will be understood that catalysts differ in respect to their activity and density and with some it is necessary to maintain a higher concentration than with others. In general the percent of catalyst by weight in the oil is between about 10 and 40% and 20 to 30% is preferable under most conditions.

The present invention is not to be limited by any theory of the mechanism of the process nor to the use of any specified catalytic material nor to any example of the operation given merely by way of illustration but only by the following claims in which it is desired to claim all novelty inherent in the invention.

I claim:

1. An improved process for destructive hydrogenation of heavy hydrocarbon oil, comprising maintaining a body of such oil containing a suspended catalytic material therein of such density and particle size as to cause rapid settling in an elongated vertical hydrogenation zone at a pressure in excess of twenty atmospheres at a decomposition temperature, continuously withdrawing a stream of the oily suspension from substantially the lowest point of the hydrogenation zone, heating the stream and returning it to the upper end of said zone, passing a gas rich in free hydrogen together with a part of the fresh oil supplied to the system through a heating zone and into the body of oil near the lower end thereof and passing the remaining part of the fresh oil into the body of oil in admixture with the recirculated stream.

2. An improved process for the destructive hydrogenation of petroleum fractions comprising maintaining a body of the oil containing in suspension a catalytic material of such density and particle size as to cause rapid settling in an elongated vertical reaction zone at a decomposing temperature and under hydrogen pressure in excess of twenty atmospheres, withdrawing the suspension from the lower end of said zone, heating it and returning it to the upper end of said zone.

3. Process according to claim 2, in which fresh oil is added to the oily suspension, withdrawn from the lower end of the reaction zone, and in which the mixture is returned to the upper end of said zone.

4. Process according to claim 2, in which recirculation of the oily suspension from the lower to the upper end of the reaction zone is continuously maintained at a rate adapted to prevent settling out of the catalyst in the lower end thereof.

HAROLD W. FISHER.